April 21, 1959 P. O. ESMAY 2,883,159
WIRE SECTIONAL FENCE
Filed Nov. 14, 1956 2 Sheets-Sheet 1

INVENTOR.
Paul O. Esmay
BY Wallenstein & Spangenberg
Attys.

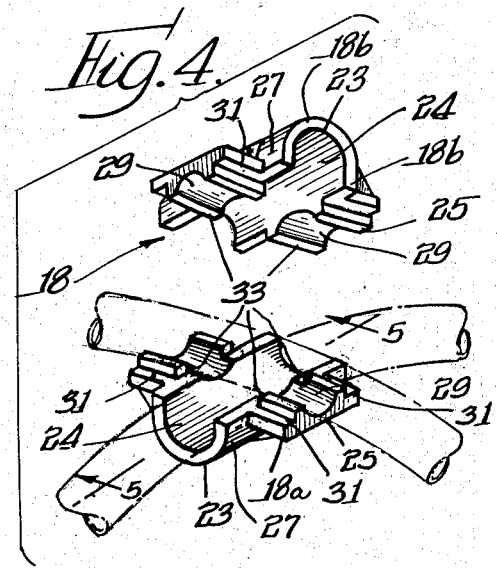
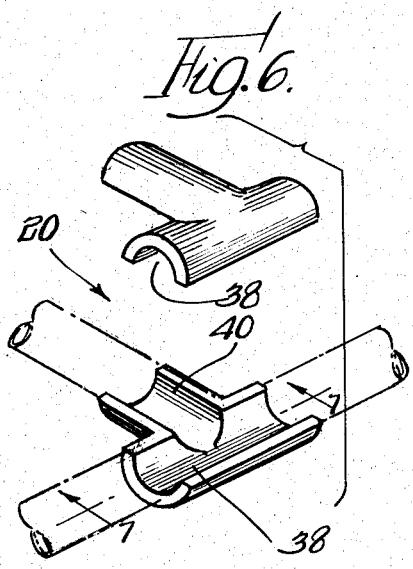
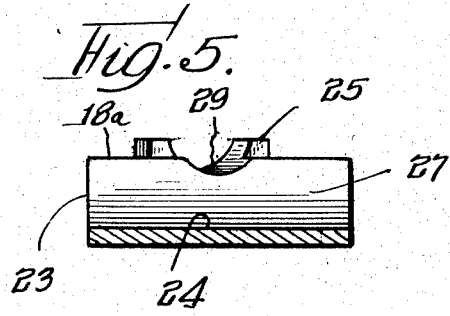
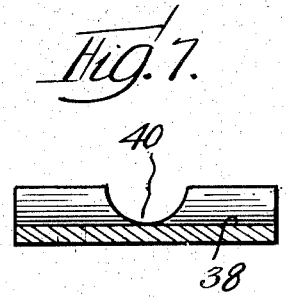
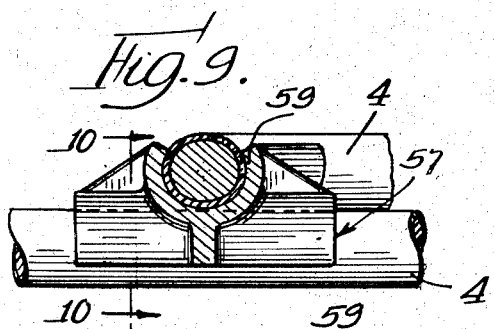
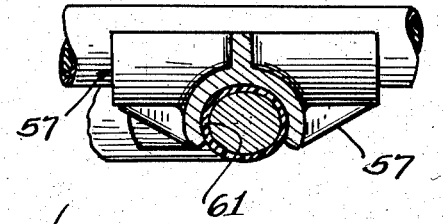
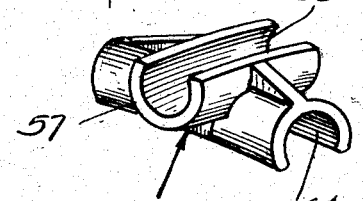

United States Patent Office 2,883,159
Patented Apr. 21, 1959

2,883,159

WIRE SECTIONAL FENCE

Paul O. Esmay, Three Rivers, Mich.

Application November 14, 1956, Serial No. 622,077

9 Claims. (Cl. 256—1)

This invention relates to the fabrication of wire products, more particularly to a new method of making wire products, particularly wire sectional fences, and to the product produced thereby.

Heretofore, wire sectional fences and the like were made from separate bent lengths of wire which were welded or riveted together. To inhibit corrosion thereof they were often dipped in paint which provided a protective coating over the wire. Unfortunately, however, the paint upon prolonged exposure to the elements scaled off whereupon rusting of the wire developed.

It is one of the objects of the present invention to provide a wire product, particularly a sectional wire fence, which is sturdy, can withstand exposure to the outside indefinitely without corroding or otherwise wearing away, can be made in any one of a number of pleasing colors, and can be made very economically to compete in price with less desirable similar products made in the manner of the prior art.

A related object of the invention is to provide a method of economicadlly fabricating a wire product made up of separate wire pieces which have been coated with a hard wear-resistant material.

In accordance with a preferred form of the invention, where the wire product is a sectional fence it is made up of a number of separate wire pieces each individually coated most desirably with a suitably colored synthetic plastic material, preferably an ester composition made with cellulose acetate butyrate, such as Tenite butyrate (Tenite #2) manufactured by Eastman Chemical Products, Inc. The wire pieces are joined together most preferably by plastic connectors of the same material as the plastic coatings of the wire pieces which connectors are fused intimately to the plastic coatings of the wire pieces. The connectors preferably each are made of two complementary halves each provided with a pair of channels to receive at least two wire pieces to be joined together. The connector halves are adapted to fit together around the wire pieces to be joined and in such position usually form two complete sockets or passages for the wire pieces. The confronting surfaces of the connector halves and of the connector sockets and plastic coatings of the wire pieces are intimately fused together to form a substantially homogeneous bond therebetween. All joints and raw edges of the fence section are attractively and protectively covered by hard tough plastic material which won't chip, discolor or otherwise wear, even when used out-of-doors continuously. The plastic of the connector and the wire pieces may include coloring matter for providing the same or pleasantly contrasting colors.

The construction above outlined lends itself to mass production techniques which result in low cost of manufacture.

In accordance with another aspect of the invention, the wire fence above described is made by a method which includes ths steps of providing a support frame in which is held one of the connector halves of each of the connectors above mentioned. The various plastic coated wire pieces are placed upon the support frame so that the wire pieces extend into the channels of the connector halves, the wire pieces and connector halves having the same relative positions they will have in the finished product. Then, the other connector half of each pair of connector halves is placed over the associated connector half so that the channels thereof are in registry to form sockets or passages which substantially completely surround the wire pieces. Then, the confronting surfaces between the connector halves and between the connector halves and the plastic coatings of the wire pieces which they surround are softened preferably by brushing or spraying the same with a solvent, or by heating where thermoplastic materials are utilized. Following this, pressure is applied preferably against the outermost connector halves to compress the connector halves together around the softened coatings of the wire pieces to intimately fuse together the connector halves and the wire pieces through a substantially homogeneous bond of plastic material. It can be appreciated that this method of fabrication enables the efficient mass production of wire products, particularly wire sectional fences.

In another form of the invention, the connectors each comprise a single body of plastic material with one or more channels formed on the outside thereof sized to closely receive the wire pieces therein, the channels preferably being slightly greater than semi-cylindrical so that the pieces can be snapped in the channels.

Other objects, advantages and features of the invention will become apparent upon making reference to the specification to follow:

Fig. 4 is an enlarged perspective exploded view of one type of connector assembly used in the wire sectional fence in Figs. 1 and 2;

Fig. 5 is an enlarged longitudinal sectional view through one of the connector halves in Fig. 4, taken along section line 5—5;

Fig. 6 is an enlarged perspective view of another type of connector assembly used in the wire sectional fence in Figs. 1 and 2;

Fig. 7 is a longitudinal sectional view through one of the connector halves of Fig. 6, taken along section line 7—7;

Fig. 8 is an enlarged perspective view of a modified form of connector usable in place of the X-shaped connectors in Fig. 1;

Fig. 9 is a transverse sectional view through a section of a plastic coated wire fence using the connector of Fig. 8; and Fig. 10 is a transverse section taken along line 10—10 of Fig. 9.

Figure 1:
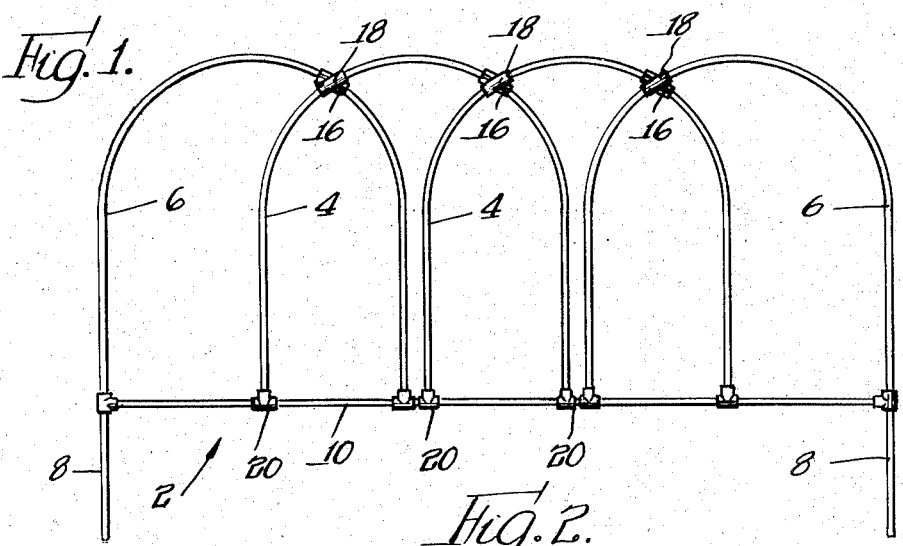
Fig. 1 is a vertical elevational view of a wire sectional fence constructed in accordance with the present invention.

The wire fence generally indicated by the reference numeral 2 is comprised of a number of inverted U-shaped wire pieces 4 placed in successive overlapping relationship to form a lattice fence framework. Inverted J-shaped outermost wire pieces 6—6 are provided, the long legs 8—8 thereof being on the outside to form extensions for insertion into the ground to support the fence section upright. A cross piece 10 extending between intermediate portions of the leg extensions 8—8 are provided to give the fence rigidity.

Each of the wire pieces 4 has a main metal wire body 12 which is encased in a sheathing or coating 14 preferably of a synthetic plastic material, most desirably Tenite butyrate manufactured by Eastman Chemical Products, Inc., which has included therein a coloring material having any one of a number of pleasing colors. The plastic coating 14 is exceptionally wear resistant, and will not chip or discolor or otherwise wear even during indefinite exposure to sunlight or moisture. The wire pieces 4, 6 and 10 are most desirably cut from a much longer length of precoated material, in which case the ends of the wire pieces will have the metal core 12 thereof exposed. The pieces are then bent in the shapes shown.

At the points 16 of cross-over of the plastic coated wire pieces there are provided X-shaped pastic connectors 18 which bind together the wire pieces. The raw ends of the wire pieces 4 and 6 abut the cross piece 10, and to these points of abutment they are joined together by T-shaped connectors 20. The connectors 18 and 20 are preferably made of the same plastic material as the plastic coatings of the wire pieces and, in a manner to be hereinafter explained, are intimately fused to the plastic coatings of the wire and form continuous, protective, tenacious joints for the wire pieces. The raw edges of the wire pieces 4 and 6 which are covered by the T-connectors 20 are completely sealed from air and moisture so that rusting or discoloring of the fence is prevented.

The X-shaped connectors 18 are each formed of a pair of complementary connector halves 18a—18b each including a relatively deeply channeled, U-shaped body portion 23 and a shallow body portion 25 extending at an angle to the body portion 23 from points contiguous to the end of the flanges or sides 27—27 of the U-shaped body portion 23. The shallow body portion 25 forms a shallow channel 29 which opens onto the deep channel 24. The shallow body portion 25 is provided with a pair of shoulders 31—31 on opposite sides of the channel 29. Projecting portions 33—33 are thereby provided which are adapted to extend between the sides of the deep channel 24 of the complementary connector half. The shoulders 31—31 receive the correspondingly shaped ends of the sides of the U-shaped body portion 23 of the associated connector half. With this construction, when the complementary connector halves, which may be identically molded plastic parts, are brought together so that the projecting portions 33—33 of the shallow portions 25—25 thereof fit within the deeply channeled body portions 23—23 thereof, respective generally cylindrical sockets are formed which are of substantially the same size and shape as the plastic coated wire pieces 4 and 6.

The T-shaped connectors 20 are likewise made of identical connector halves which are plastic molded parts preferably made of the same material as the plastic coatings of the wire pieces 4 and 6. The connector halves each have a pair of semi-cylindrical channels 38—40 which intersect so as to receive the cross piece 10 and the abutting end of one of the wire pieces 4 or 6. When the complementary connector halves are placed with their channel sides confronting one another and in abutment, respective sockets are formed of generally the same size and shape as the wire pieces 4 and 6.

In a manner to be explained hereafter, the confronting surfaces of the defining walls of the connector channels and the plastic coatings of the wire pieces and also the confronting surfaces of the connector halves are intimately fused together along substantially their entire mutually facing areas so that a continuous, homogeneous bond is formed therebetween. The raw edges of the wire pieces 4 and 6 are thereby completely sealed off from the atmosphere and are obscured from view. Attractive, pleasantly-shaped joints between the various wire pieces are formed by the connectors, which may be colored the same or in pleasant contrast to the color of the plastic coatings of the wire pieces. The manner in which the wire sectional fence is assembled will now be described.

Figure 2:
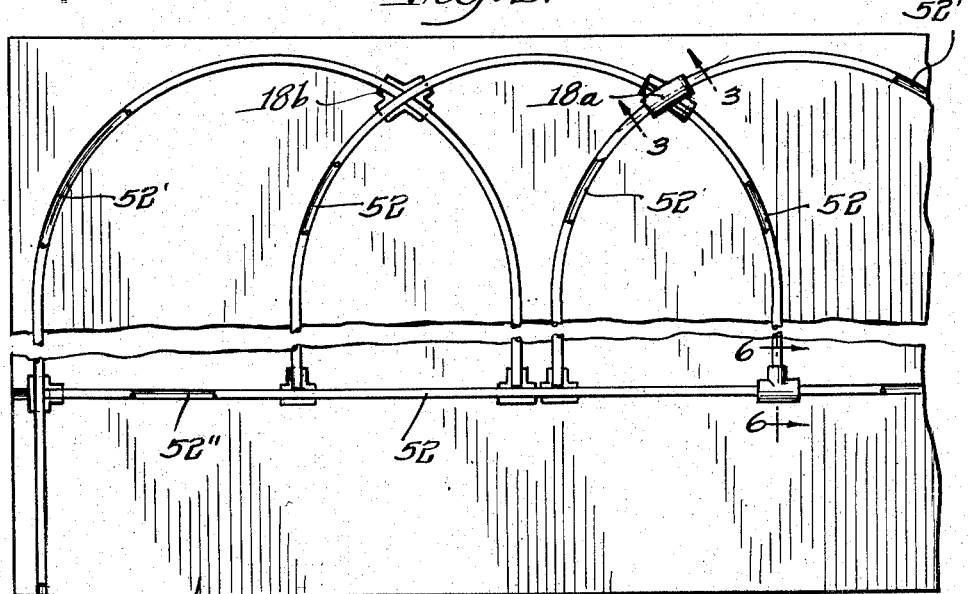
Fig. 2 illustrates, on an enlarged scale, with parts broken away, the manner in which the wire sectional fence in Fig. 1 is fabricated, showing particularly the holding frame for the wire pieces and connector halves prior to the application of pressure to the connector halves.
Figure 3:
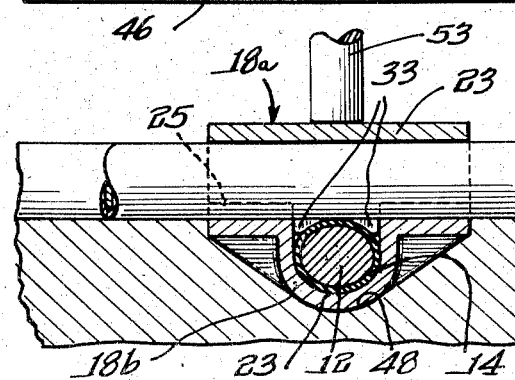
Fig. 3 is a greatly enlarged sectional view through the assembly of Fig. 2, taken along section line 3—3.

A mounting frame 46 (Fig. 2) is provided having recesses such as 48 (Fig. 3), shaped to conform to the connector halves making up the connectors 18 and 20, respectively. These recesses occupy the same relative positions as will the connectors 18 and 20 in the finished product. The mounting frame 46 also includes channels 52, 52' and 52" which are adapted to receive the various wire pieces making up the fence 2 and, accordingly, have the same positions relative to the recesses 48 as the wire pieces have with respect to the connectors 18 and 20. In assembling the fence, one of the connector halves of each pair of connector halves are positioned in the appropriate frame recesses such as 48 and the wire pieces 4, 6 and 10 are then positioned in the appropriate frame channels 52, 52' and 52". Then, the other connector half of each pair of connector halves is positioned over the complementary connector halves and the wire pieces on the frame 46 so that the connector halves provide the sockets or passages through which the wire pieces pass or extend.

The next step in the fabrication process is to soften the confronting plastic surfaces of the connector halves and of the connector halves and the coatings of the wire pieces. This may be done in a variety of ways. Preferably, a suitable solvent for the plastic material involved may be sprayed or brushed on the various points to be fused together, the solvent flowing upon the various above-mentioned confronting surfaces due to the looseness of the relationship of the assembled parts at this point in the process. In the case where the plastic material is Tenite butyrate, the solvent may have one of the following compositions:

(a)

70% Acetone
30% Methyl "Cellosolve" acetate (b)

80% Butyl acetate
20% Butyl lactate

Alternatively, where a thermoplastic material is utilized for the connectors and the coatings, the surfaces to be fused may be heated in any suitable manner to their softening points.

The last step in the fabrication process is the application of pressure to the uppermost connector halves which compress the connector halves tightly around the softened plastic coating of the wire pieces. This intimately fuses or bonds the connector halves to each other and the plastic coatings of the wire pieces. The pressure may be applied in any suitable manner such as by a metal frame having fingers 53 (Fig. 3) adapted to simultaneously engage the various connectors of the assembly above mentioned. Following the application of pressure and the setting of the plastic material, or the cooling thereof in the case where thermoplastic material is utilized, the completed sectional fence may be removed from the frame 46.

Refer now to Figures 8–10 showing another form of connector usable in constructing the sectional fence of Fig. 1. This connector is made of a single molded body 57 of plastic material having channels 59—61 formed on the outside thereof extending at the same angles the wire pieces to be secured thereby are to extend in the finished product. The channels are shaped to closely receive the plastic coated wire pieces to be connected together, and, where the latter are circular in cross section, the channels preferably have a circular curvature extending a few degrees past 180° so that the resilient plastic of the connector body may be deformed slightly to snap around the wire pieces.

As in the other connector previously described, the connector bodies and the coatings of the wire pieces, which are all preferably made of the identical plastic material, are softened by using a suitable solvent or heat and fused together under pressure to form a strong homogeneous bond between the connector and plastic-coated wire pieces.

Although the method and production of the invention is particularly suitable for the fabrication of wire sectional fences, wherein the wire sections making up the fence are coated with a plastic material, it should be noted that other products may be made using the method and constructional features of the invention, such as display racks, clothes driers, clothes hangers, shoe racks, etc.

I claim:

1. A wire fence structure or the like comprising a plurality of elongated elements composed of plastic material each having completely enclosed therein a metal core which imparts rigidity to the individual elongated elements, the plastic material of each elongated element being integrally joined to the plastic material of at least one other element to form a unitary fence structure or the like.

2. The structure of claim 1, wherein each of the elongated elements is joined to an adjacent elongated element by at least one protuberant body of plastic material surrounding the adjacent portions of the elongated elements.

3. The structure of claim 1 wherein the plastic material of each of the elongated elements constitutes a coating around the metal core.

4. The structure of claim 3 wherein each of said elongated elements is joined to another elongated element over limited regions thereof by a plastic connector having a pair of passages therein receiving only adjacent portions of the elongated elements and bonded to the plastic coatings thereof.

5. The structure of claim 4 wherein said plastic connector is formed of two confronting complementary halves each having complementary channels which form said passages with the other connector half, and the confronting portions of said connector halves being bonded to each other as well as to the plastic coatings of the elongated elements connected thereby.

6. The structure of claim 3 wherein adjacent intermediate portions of said elongated elements cross one another and are joined in offset planes by at least one plastic connector formed by two complementary halves, each half having a pair of channels angled to receive said elongated elements at an angle to one another, one of the channels being sufficiently deep to substantially completely receive one of the elongated elements and the other channel being shallow and being formed by projecting portions which extend partway into the deep channel of the corresponding connector half, thereby to form two offset passages for receiving the offset intermediate portions of said elongated elements, the connector halves having mutually contacting surfaces which are bonded together, and the defining walls of said passages being bonded to the plastic coatings of the elongated elements.

7. The structure of claim 3 wherein the end face of one of said elongated elements is uncoated and extends at an angle and is joined to the intermediate portion of another elongated element by a connector having a pair of channels formed therein which channels form respective passages into which parts of said elongated elements extend, said connector being bonded to the plastic coatings of the wire sections extending therein, to thereby join together the wire sections and encase said uncoated end of said elongated element to seal the same from the atmosphere.

8. The structure of claim 3 wherein each of said elongated elements is joined to another elongated element by a plastic connector comprising a single body of plastic material having channel means formed in the outside surface thereof which channel means closely receive said elongated elements, the confronting surfaces of said connector means and the plastic coatings of said elongated elements being intimately bonded together to form a single homogeneous body.

9. The structure of claim 3 wherein only adjacent intermediate portions of said elongated elements cross one another and are joined in offset planes by a plastic connector having a pair of offset channels which receive said elongated elements and the plastic defining walls thereof being bonded to the plastic coatings of said elongated elements to hold the latter together.

References Cited in the file of this patent

UNITED STATES PATENTS

| | | |
|---|---|---|
| 444,960 | Priday | Jan. 20, 1891 |
| 2,238,779 | Moseback | Apr. 15, 1941 |
| 2,333,869 | Larkin | Nov. 9, 1943 |
| 2,338,524 | McCabe | Jan. 4, 1944 |
| 2,436,984 | Wilson | Mar. 2, 1948 |
| 2,742,391 | Warp | Apr. 17, 1956 |